United States Patent [19]

Griesen

[11] E Patent Number: Re. 32,116

[45] Reissued Date of Patent: Apr. 15, 1986

[54] ELECTRICAL VACUUM SWITCH HAVING MEANS FOR GENERATING AN AXIAL MAGNETIC FIELD BETWEEN THE CONTACT FACES

[75] Inventor: Bertus Griesen, Hengelo (O), Netherlands

[73] Assignee: Hazemeijer B.V., Hengelo (O), Netherlands

[21] Appl. No.: 557,539

[22] Filed: Dec. 2, 1983

Related U.S. Patent Documents

Reissue of:

[64] Patent No.: 4,271,340
Issued: Jun. 2, 1981
Appl. No.: 965,409
Filed: Dec. 1, 1978

[30] Foreign Application Priority Data

Dec. 5, 1977 [NL] Netherlands ..... 7713436

[51] Int. Cl.[4] ..... H01H 33/66

[52] U.S. Cl. ..... 200/144 B; 200/147 R; 200/262

[58] Field of Search ..... 200/144 B, 147 R, 147 A, 200/262, 263, 274, 275

[56] References Cited

U.S. PATENT DOCUMENTS

| | | | |
|---|---|---|---|
| 3,014,107 | 12/1961 | Cobine et al. | 200/147 R X |
| 3,082,307 | 3/1963 | Greenwood | 200/144 B |
| 3,158,722 | 11/1964 | Porter | 200/147 R |
| 3,218,426 | 11/1965 | Montoya et al. | 200/262 |
| 3,384,772 | 5/1968 | Rabinowitz | 200/144 B |
| 3,892,461 | 7/1975 | Keto | 200/147 A X |

FOREIGN PATENT DOCUMENTS

| | | |
|---|---|---|
| 1236628 | 3/1967 | Fed. Rep. of Germany . |
| 1287671 | 1/1969 | Fed. Rep. of Germany . |
| 1930247 | 12/1970 | Fed. Rep. of Germany . |
| 2254871 | 11/1975 | France . |
| 7601084 | 8/1977 | Netherlands . |
| 567616 | 2/1945 | United Kingdom . |

*Primary Examiner*—J. R. Scott
*Attorney, Agent, or Firm*—Watson, Cole, Grindle & Watson

[57] ABSTRACT

Electrical vacuum switch having two contact members carried by contact rods for moving the contact members in and out of engagement with each other, in which each contact rod is partly surrounded by a yoke of magnetic permeable material, closely adjacent each contact member, each yoke leaving a gap between the yoke legs, so that upon moving the contact members out of engagement, the magnetic flux lines, generated in each yoke by the current through the contact rods, will traverse the arcing gap between the contact members, towards the opposing yoke, resulting in a magnetic field in the arcing gap.

13 Claims, 5 Drawing Figures

ELECTRICAL VACUUM SWITCH HAVING MEANS FOR GENERATING AN AXIAL MAGNETIC FIELD BETWEEN THE CONTACT FACES

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to an electrical vacuum switch having two contact members movable in and out of engagement with each other and means for generating an axial magnetic field between the contact faces.

2. Prior Art

A switch of the type described above is known from Dutch Patent Application No. 7601084. The latter patent application concerns a vacuum switch. Due to the produced axial magnetic field the interrupter properties of the switch are improved considerably. In this known switch the means for generating the axial magnetic field consists of a pair of spiral coils connected in series with the contact members. These coils have been mounted on either side of the tangent plane of the contact members, the winding direction thereof being such that an axial magnetic field is generated in situ at this tangent plane when the coils are energized by means of an electrical current. The manner of generating the axial magnetic field in the known switch incurs the drawback that in these coils due to the electrical resistence thereof the electrical current causes a continuous heat generation detrimentally affecting the permissable maximum current level to be passed continuously through the vacuum switch.

SUMMARY OF THE INVENTION

The object of the present invention is to evade this drawback of the known switch. The switch according to the invention is characterized by the fact that on either side of the tangent plane between the contact members in the proximity of this tangent plane either contact rod carrying a contact member has been partially surrounded by at least one yoke comprising a material having a good magnetic permeability. Each of the yokes includes a part having a low magnetic permeability situated with respect to the axis through the contact rods at a location opposite to the location of the part having a low magnetic permeability of the opposite yoke, the arrangement being such that upon passage of current through the switch, each of the yokes is magnetized and the flux lines, emanating from each yoke at the tangent and separating plane between the contacts, traverse substantially to the opposite yoke.

Upon passage of current through the contact members due to which a magnetic field is produced round about the contact members, a large part of this magnetic field will flow through the yokes as a magnetic flux. Due to the part having a low permeability present in each magnetic circuit constituted by a yoke round about a contact member, a large part of the flux lines will traverse to the yoke situated on the opposite side of the tangent plane between the contact members if the distance therebetween is sufficiently small. Consequently a mainly axially directed magnetic field is produced between the contact members, the axial magnetic field having the same effect as the magnetic field produced by the coils in the switch according to the above mentioned Dutch Patent Application.

Preferably the yokes are U-shaped, whereby it is possible to slide the yoke onto the contact rods of a switch. The distance between the legs of this U-shaped yoke will preferably be equal to the outer diameter of the contact rods.

The part of the yoke having a low permeability is provided by the air gap between the open ends of the legs. This part may also be filled with an electrically good conducting material, whereby the arc extinguishing action will be enhanced further.

BRIEF DESCRIPTION OF THE DRAWINGS

The invention will be better understood by referring now to the following detailed description taken in conjunction with the drawings showing a single embodiment in which.

DETAILED DESCRIPTION

Figure 1:
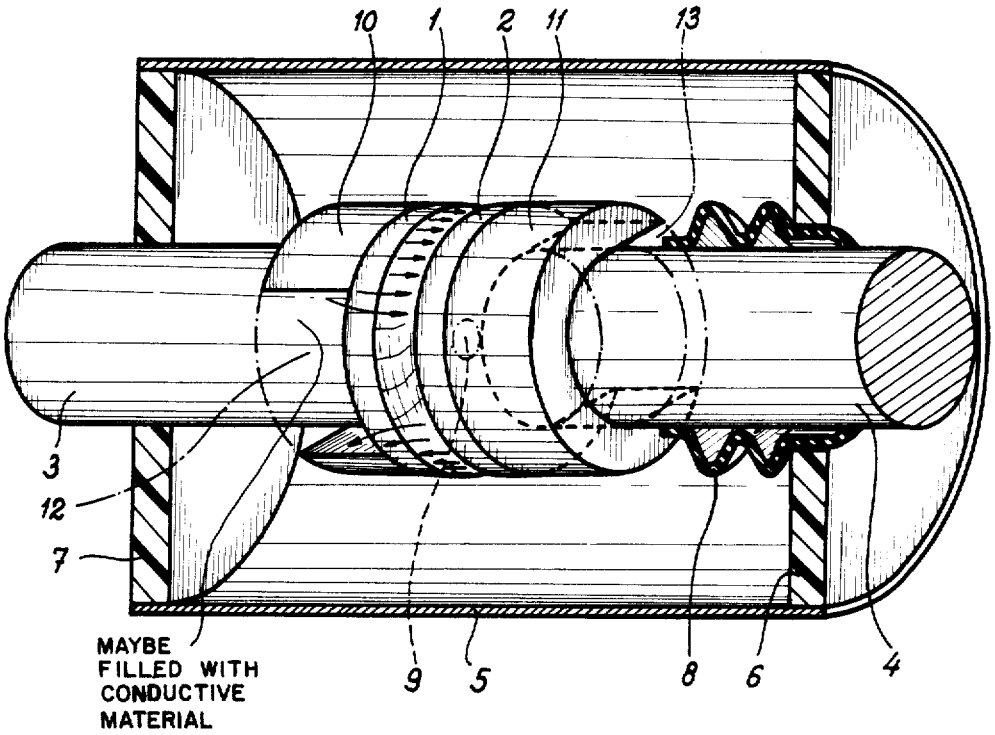
FIG. 1 is a perspective view of a vacuum switch according to the invention showing the housing partially opened.

Referring now to the vacuum switch of FIG. 1 there is shown an evacuated housing consisting of a metallic cylindrical part 5 and disk-like insulator parts 6 and 7 closing the cylindrical part on both ends thereof. Within the evacuated housing there are two contact members consisting of contact disks 1 and 2 mounted on contact rods 3 and 4, respectively. The contact rod 3 is stationary secured to the insulator part 7, whereas the contact rod 4 with the contact disk 2 mounted thereon may be moved to and from the contact disk 1, to which effect the contact rod 4 is connected to the insulator part 6 by means of a flexible bellows 8. In FIG. 1 the contact disks 1 and 2 meet each other in the tangent plane 9.

At a relatively small distance from this tangent plane 9, and on either side thereof U-shaped yokes 10 and 11 have been mounted about the contact rods 3 and 4. Yokes 10 and 11 are made of a material having a good magnetic permeability. In the represented embodiment each of the yokes has been shaped as a broad ring of, for instance, soft iron. The yokes may be solid, though they may also be laminated as will be preferred of course in case of alternating current. Each of yoke rings 10 and 11 has an inner diameter somewhat larger than the size of the pertaining contact rods 3 and 4. In the present embodiment the outer diameter has been chosen equal to the outer diameter of the contact disks 1 and 2. Furthermore each of the yokes 10 and 11 has been provided with an air gap 12 and 13 respectively, between the legs, each air gap having a constant width from the outside of the inside equalling the inner diameter of the ring. Each of the yokes has thus been slid over the pertaining contact rod until the yoke is in abutment with the contact rod.

The yokes 10 and 11 lie in substantially parallel planes (see also FIG. 2) as closely as possible to the tangent plane 9 and reset against the contact disks 1 and 2. Preferably in the direction of the open end of the yoke the legs of the first yoke occupy a direction opposite to the direction of the legs of the second cooperating yoke. In other words upon axial projection of the first yoke on the second yoke the solid part of the first yoke will at least partially overlap the opening between the ends of the legs of the second yoke.

Figure 2:
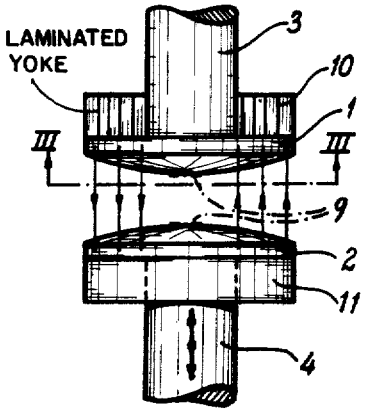
FIG. 2 is a side elevational view of the contact members provided with the U-shaped yokes and also illustrating an alternative laminated construction of the yokes.
Figure 3:
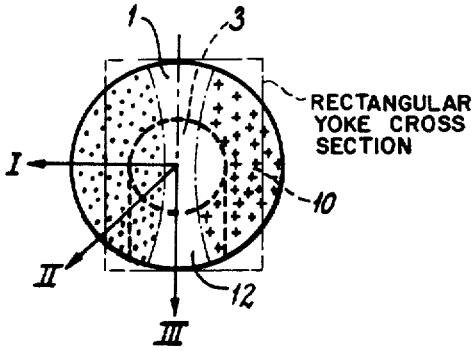
FIG. 3 is a representation of a contact disk, viewed from the contact face along the line III—III in FIG. 2 and also showing an alternative rectangular cross-section of the yokes.

FIGS. 1-3, inclusive, also show the course of the magnetic flux lines in case of the passage of an electrical current through the switch. The magnetic field produced by this current passage through the switch is concentrated partially in the yokes 10 and 11 due to the good magnetic permeability of the yokes. In combination with the air gaps 12 and 13 situated between the open ends of the legs, the yokes 10 and 11 present on the respective sides of the tangent plane each constitute a magnetic circuit running partly round the contact rod. These air gaps 12 and 13 have—at least as long the contact members are in touch—a width larger than the distance between the yokes on both sides of the tangent plane 9 when viewed in the axial direction. Consequently the magnetic flux lines will traverse to the yoke on the other side of the tangent plane rather than to the opposite leg of its own yoke. In FIG. 1 this situation has clearly been shown. This traversion of the flux lines not only occurs at the site of the air gap but rather the main part of the flux lines will run between the parallel legs of the two yokes 10 and 11 having the opposite direction and facing each other due to the initially short distance between the yokes. In FIG. 3 this situation has further been shown. The dots and crosses represent flux lines running perpendicularly to the plane of the drawing. As will be evident a traversion of only a small part of the flux lines occurs at the site of the air gap per se, indicated by the interrupted axis. In FIG. 3 in the right hand part the flux lines disappear in the plane of the drawing whereas in the left hand part the flux lines emerge from the plane of the drawing. The directions of the flux lines have also been indicated in FIG. 2 representing the case in which upon opening the contact members the contact disks are already at a certain distance from each other.

Figure 4:
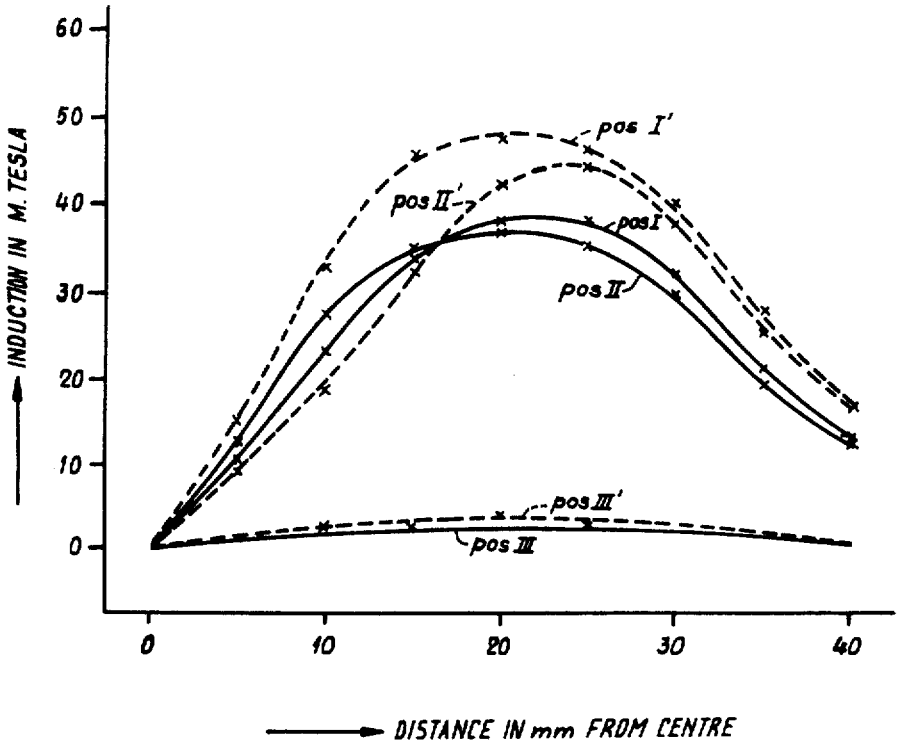
FIG. 4 is a graphical representation of the strength of the magnetic field between the contact disks vs the distance measured from the center of these disks.

FIG. 4 graphically represents the course of the density of the magnetic field produced by the yokes at the side of the tangent plane on current passage in the directions indicated in FIG. 3 by arrows I, II and III. In FIG. 4 the distance measured from the center of the contact disks has been plotted in millimeter units along the abscissa whereas the induction expressed in Tesla-units has been plotted along the ordinate. It is apparent that the density of the magnetic field is the highest in the region of the arrow I. This is in accordance with what is to be expected expectations because the influence of the parts having a low permeability will be the least noticeable in this region.

The current used for these measurements amounted to 1800 amps A.C. The Roman numeral in the curves without an accent pertains to the measurement on a contact disk having a thickness of 3 mm and the Roman numeral with an accent corresponds to the measurement on a contact disk having a thickness of 1 mm. The thickness of the disks thus has a considerable influence on the strength of the magnetic field. Likewise the location of the magnetic induction is influenced by the thickness.

The measurements for obtaining the curves in FIG. 4 have been performed on yokes having an external circular shape. The invention however, is not restricted thereto. Likewise the shape of the U-shaped yokes will influence the course of the curves.

From FIG. 4 it furthermore appears that a weak magnetic field is only present in the region of the arrow III. i.e. the region of the tangent plane between the contact disks running parallel with the space between the legs of the yokes. In the main part of the tangent plane and the space between the contact disks flux lines, and consequently a more or less strong magnetic field, occur upon displacement of the contact disks with respect to each other. Like in the switch according to the above mentioned Dutch Patent Application No. 7601084 this results in a considerable improvement of the interruptor properties of the switch according to the invention.

Upon further displacement of the contact disks 1 and 2, and thus the yokes 10 and 11 with respect to each other, the strength of the axial magnetic field between the yokes and consequently between the contact disks will decrease due to the increasing distance, whereas the strength of the field between the two legs of each of the yokes will increase. The contact disks and yokes may, however, easily be constructed and mounted in such a manner that a sufficiently strong axially directed field will remain during the operative part of the circuit breaking procedure. This applies to the switch having the dimensions according to FIG. 2 which has been drawn on real scale. The contact rods have a diameter of 25 mm, the contact disks a diameter of 60 mm and a thickness of 2 mm. Even if upon opening the distance between the yokes amounts to 16 mm, a sufficiently strong axial magnetic field between the yokes 10 and 11 will still be present.

It has been found by experiments with switches according to the present invention that the arc voltage of the switches is improved considerably.

Figure 5:
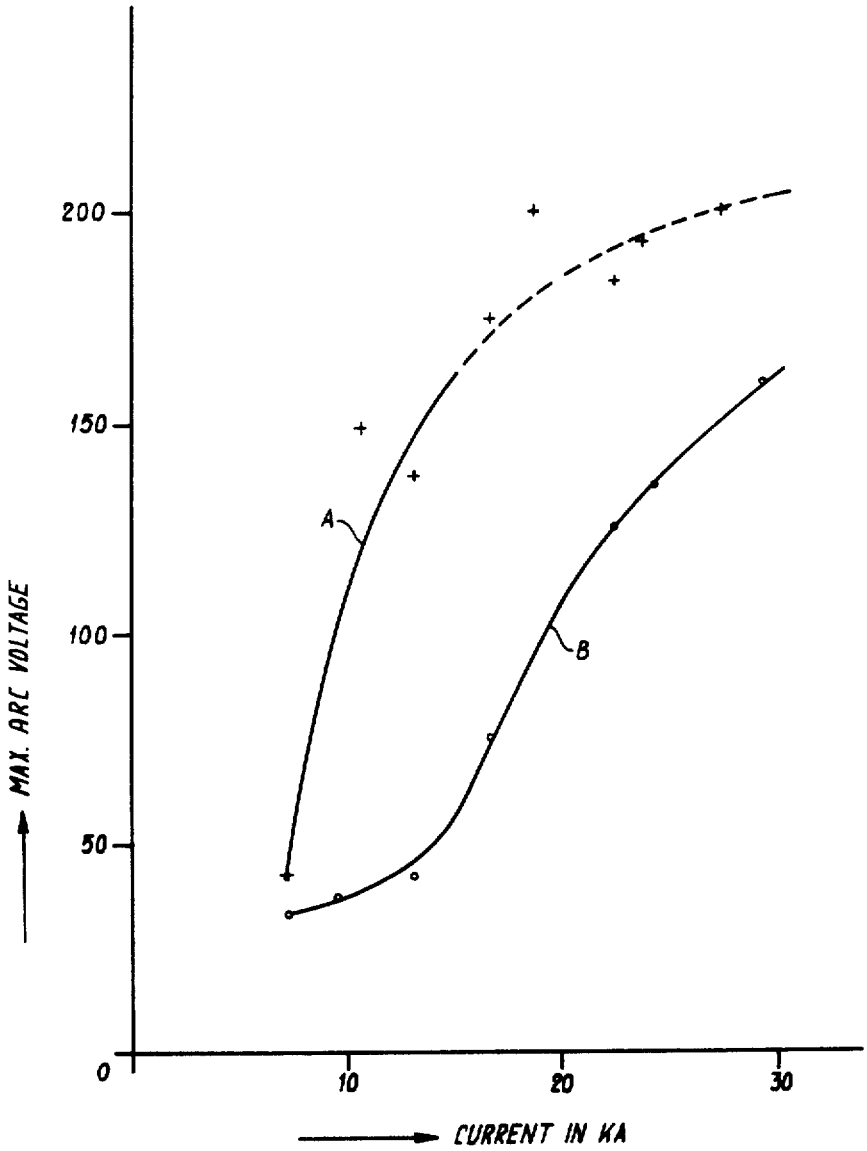
FIG. 5 is a graphical representation of the operation of the switch according to the invention.

FIG. 5 shows a graphical representation of the maximum arc voltage expressed in Volts, vs the interrupted current, expressed in Kiloamps. The curve A relates to a switch without a longitudinal magnetic field, whereas the curve B concerns a switch according to the invention in which a longitudinal magnetic field is produced by the U-shaped yokes. From this diagram it is apparent that the switch according to the invention may interrupt currents of about 30 Kiloamps, whereas the switch without this provision cannot interrupt currents of more than 15 Kilo amps in a reliable manner.

The air gaps 12 and 13 may also be filled with a solid piece of an electrically good conductor material such as copper.

It has been demonstrated that in this case the magnetic resistance may yet further be increased. This may be explained by the eddy currents generated by the magnetic field in the piece of copper, the eddy currents on their turn also producing a magnetic field having a direction opposite to the initial field.

This effect may be utilized in two ways, that is, either by maintaining the gap width, with the result that even upon increasing the distance between the yokes the magnetic flux will still traverse and thus create an axial field; or by maintaining the magnetic resistance, the latter meaning that the gap width may be narrowed due to which the operative part of the yoke is broadened and the regions having a weak magnetic field are consequently reduced.

In FIG. 1 the inserts for filling the air gaps 12 and 13 have been indicated in dotted lines.

It will be obvious that the invention is not restricted to the embodiment shown and described above and that various changes and modifications are possible within the true spirit and scope of the invention.

I claim:

1. An electrical vacuum switch within a vacuum switch enclosure, comprising:

two contact members movable in and out of engagement with one another; and at least one magnetically permeable yoke partially surrounding each of said two contact members in a region proximate to the tangent plane of contact between said two contact members, each of said yokes including a part having a low magnetic permeability, said part having a low magnetic permeability of each of said yokes being positioned with respect to an axis through said two contact members at a location opposite to the location of said part having a low magnetic permeability of the other yoke, such that upon the passage of current through the vacuum switch each of said yokes is magnetized and the flux lines emanating from each yoke at the tangent plane of contact between the two contact members traverses substantially to the other yoke.

2. The vacuum switch according to claim 1, wherein each said yoke is U-shaped, and the part having a low magnetic permeability is embodied by an air gap between the legs of the yoke.

3. The vacuum switch according to claim 2, wherein the air gap is filled with an electrically good conducting material.

4. The vacuum switch according to claim 2, wherein each said yoke consists of an open ring having a rectangular cross section.

5. The vacuum switch according to claim 4, wherein the distance between the legs at the air gap equals the inner diameter of the ring.

6. The vacuum switch according to any one of claims 1, 2, 3, 4 or 5, wherein said yokes consist of iron.

7. The vacuum switch according to any one of claims 1, 2, 3, 4 or 5 wherein said yokes are laminated.

*8. An electrical vacuum switch, comprising:*

*two contact members in facing relationship and supported at the free ends of aligned contact rods, at least one of the rods being axially movable with respect to the other to open and close the switch, in closed position of the switch said contact members define a contact plane therebetween and extending perpendicular to the contact rods center line, said magnetic members being positioned near said contact member at both sides of said contact plane for generating a magnetic field from the switch current, said magnetic members having a non-magnetic gap area and being rotationally displaced relative to one another such that the gap area of the one member is positioned opposite to an area of magnetic material of the other member, each magnetic member is formed by a separate ferromagnetic laminated U-shaped yoke, having a gap area with a width equal to the width of the inner diameter of the half circular portion of said yoke, said inner diameter is mainly equal to the diameter of the contact rod, each yoke being positioned around said rod adjacent the side of the associated contact member opposite to the side of said contact member facing the other contact member, such that the magnetic field generated by the switch current supports the arc extinguishing action upon opening the vacuum switch.*

*9. An electrical vacuum switch within a vacuum switch enclosure, comprising:*

*two contact members movable in and out of engagement with one another; and*

*at least one magnetically permeable yoke partially surrounding each of said two contact members in a region proximate to the tangent plane of contact between said two contact members, each of said yokes including a part having a low magnetic permeability, said part having a low magnetic permeability of each of said yokes being positioned with respect to an axis through said two contact members at a location opposite to the location of said part having a low magnetic permeability of the other yoke, such that upon the passage of current through the vacuum switch upon out of engagement movement of said two contact members each of said yokes is magnetized and the flux lines emanating from each yoke at the tangent plane of contact between the two contact members traverses substantially to the other yoke to enhance arc extinguishing upon opening of said switch.*

*10. The vacuum switch according to claim 9, wherein each said yoke is U-shaped, and the part having a low magnetic permeability is embodied by an air gap between the legs of the yoke.*

*11. The vacuum switch according to claim 10, wherein the air gap is filled with an electrically good conducting material.*

*12. The vacuum switch according to claim 10, wherein each said yoke consists of an open ring having a rectangular cross section.*

*13. The vacuum switch according to claim 12, wherein the distance between the legs at the air gap equals the inner diameter of the ring.*

* * * * *